April 12, 1966  J. E. HERRINGTON  3,245,616
DISPLAY DEVICE

Filed Dec. 30, 1963  4 Sheets-Sheet 1

INVENTOR.
JAMES E. HERRINGTON
BY
John F. A. Earley
ATTORNEY.

April 12, 1966  J. E. HERRINGTON  3,245,616
DISPLAY DEVICE

Filed Dec. 30, 1963  4 Sheets-Sheet 2

INVENTOR.
JAMES E. HERRINGTON
BY
John F. A. Earley
ATTORNEY.

April 12, 1966 J. E. HERRINGTON 3,245,616
DISPLAY DEVICE

Filed Dec. 30, 1963 4 Sheets-Sheet 3

INVENTOR.
JAMES E. HERRINGTON
BY
John F. A. Earley
ATTORNEY.

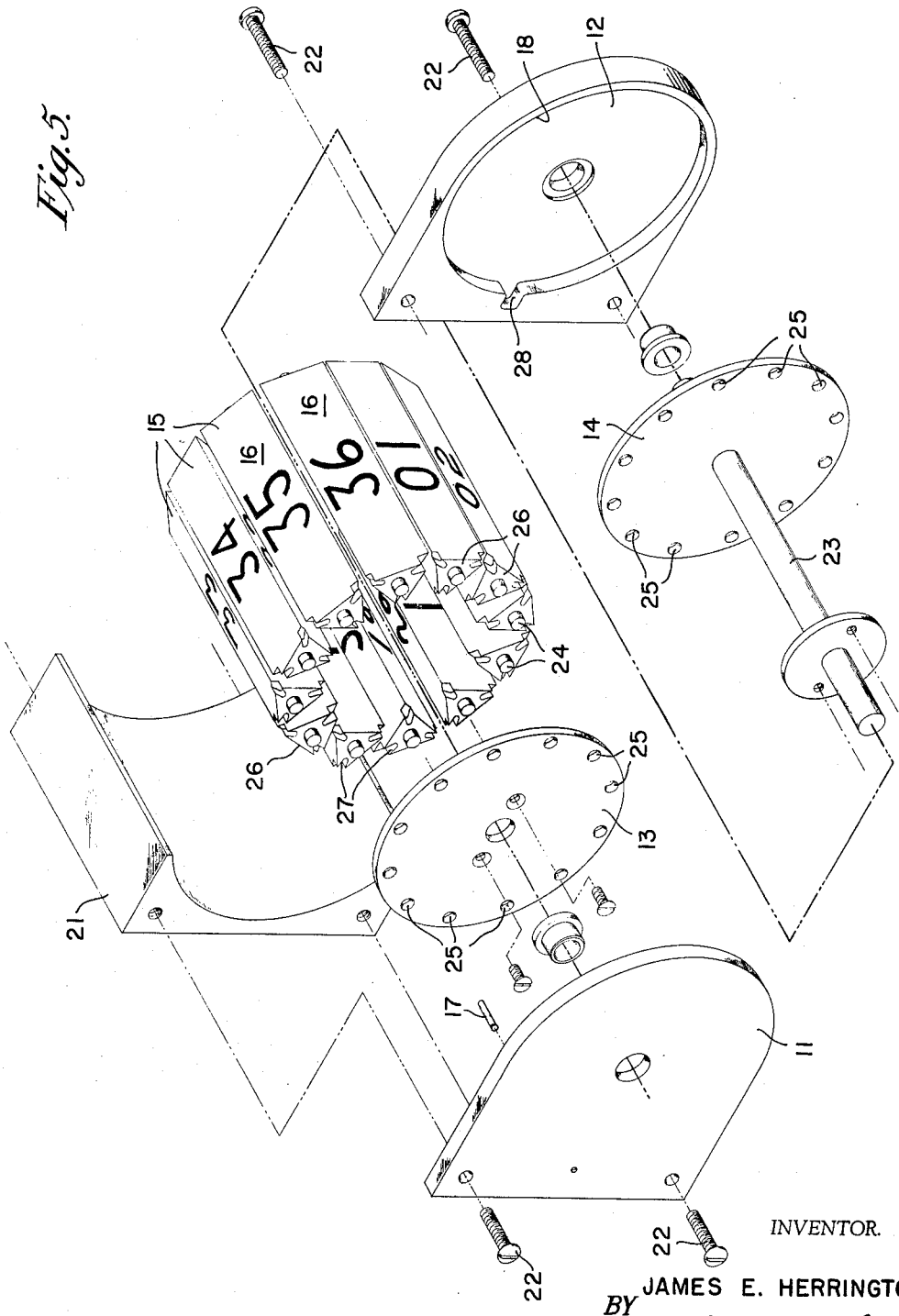

United States Patent Office 3,245,616
Patented Apr. 12, 1966

3,245,616
DISPLAY DEVICE
James E. Herrington, Colorado Springs, Colo., assignor to Litton Precision Products Inc., Clifton Heights, Pa., a corporation of Delaware
Filed Dec. 30, 1963, Ser. No. 334,128
2 Claims. (Cl. 235—72)

This invention relates to a display device, and more particularly concerns such a device which sequentially and repeatedly displays a large number of display elements. The invention is reversible, is operable at all attitudes, and may be used as a reversible counter for displaying 36 numbers. As such a counter, it is adaptable for use with an odometer wheel to act as a 360° angle counter.

It is an object of this invention to provide a display device of improved construction.

It is another object of this invention to provide a display device which has fewer elements than conventional devices, which has less complicated moving parts, and which does not require high driving torque.

It is another object to provide a display element which is compact, and is light weight.

Other objects and advantages of the invention, including its simplicity and economy, as well as the ease with which it may be adapted for existing equipment, will further become apparent hereinafter and in the drawings, in which:

FIG. 5 is an exploded isometric view of the display device.

Figure 1:
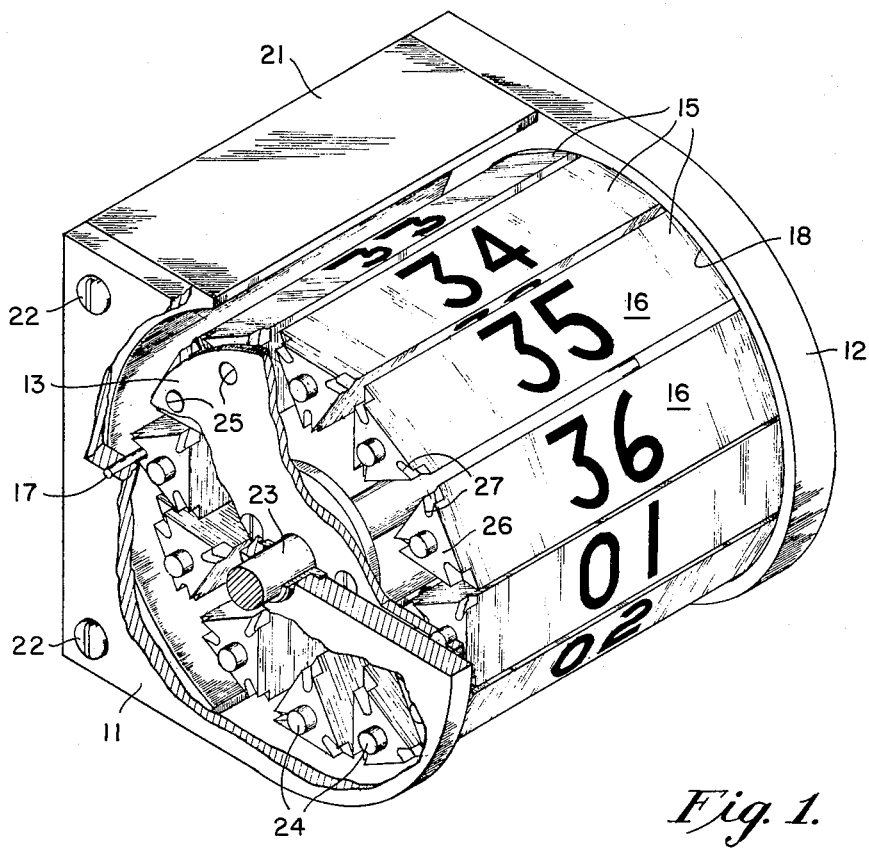
FIG. 1 is an isometric view of a display device constructed in accordance with this invention.
Figure 2:
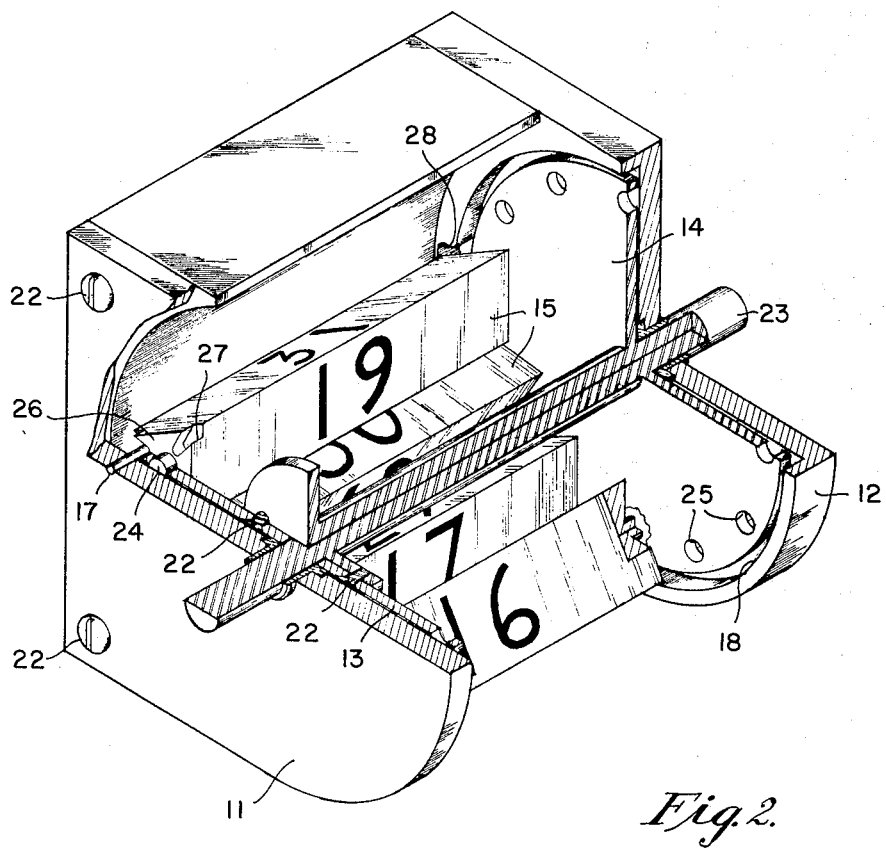
FIG. 2 is a view similar to FIG. 1 with parts cut away in order to better illustrate the invention.
Figure 3:
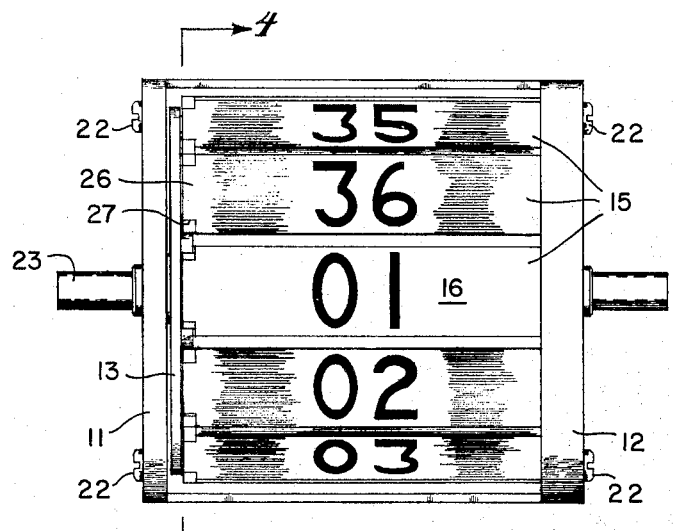
FIG. 3 is a view in front elevation of the display device of FIGS. 1 and 2.
Figure 4:
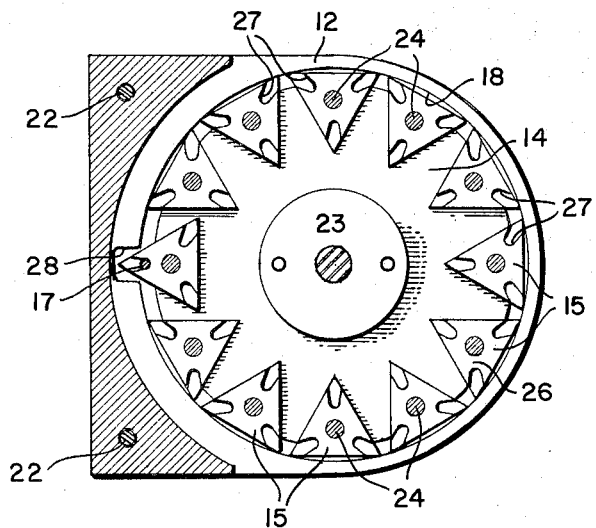
FIG. 4 is a view in section taken as indicated by the lines and arrows 4—4 which appear in FIG. 3.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown a display device which comprises a pair of end plates 11, 12 spaced apart from each other, a pair of driving wheels 13, 14 rotatably mounted between the end plates, a series of display elements 15 rotatably mounted between the driving wheels, with the display elements having a plurality of faces 16, means on display elements 15 and on the plates for tripping display elements 15 to display a desired face, said tripping means including a tripping finger 17 mounted on end plate 11, and guide means, such as guide shoulder 18 formed in end plate 12, for preventing unwanted rotation of display elements 15.

End plates 11 and 12 are spaced apart from each other by a rear support 21 to which the end plates are attached by screws 22.

Driving wheels 13 and 14 are mounted on a shaft 23 which is rotatably mounted between the end plates 11 and 12.

Display elements 15 are illustrated as having three faces and as having a cross section which is an equilateral triangle. Twelve display elements are shown and they bear numbers from 1 to 36. It is to be realized that the display elements may be multi-faced and that a greater or lesser number of display elements may be used.

Each display element 15 is provided with laterally extending trunnions 24 which engage the holes 25 in driving wheels 13, 14 and are rotatably supported therein.

The means for tripping the display elements 15 to show a desired face includes the aforesaid tripping finger 17 which extends from end plate 11, and a tripping member mounted on or forming an end of each display element 15 and rotatable therewith. Each tripping member 26 is provided with a plurality of tripping notches 27. In the embodiment of the invention illustrated in the drawings, each tripping member 26 has three tripping notches 27, one disposed at each corner of the three-faced display element.

Tripping finger 17 is adapted to contact a tripping notch 27 to cause tripping rotation of the display elements 15 to display another face 16.

Guide shoulder 18 on an end plate 12 prevents unwanted rotation of display elements 15 during the course of their rotation by driving wheels 13, 14. Shoulder 18 overlaps the end of the display element faces 16 to prevent rotation about trunnions 24.

Guide shoulder 18 is provided with a cut-out portion 28 which permits the tripping rotation of display elements 15.

In operation, shaft 23 is driven to rotate driving wheels 13, 14 which rotate display elements 15 about shaft 23. When a display element 15 approaches the position of tripping finger 17, it is tripped and another face 16 is displayed through the action of finger 17 contacting a tripping notch 27 in tripping member 26 to cause tripping rotation of the display element about its trunnion 24. The rotation is 120° in the embodiment illustrated in the drawings, and such rotation is permitted by cut-out portion 28 in guide shoulder 18. The element 15 with its new face 16 displayed is then rotated about shaft 23 by driving wheels 13, 14, and unwanted rotation of the display element about its trunnions 24 is prevented by guide shoulder 18 of end plate 12.

It will be realized that the display element shown in the drawings may display 36 numbers and may be adapted for use with an odometer wheel to act as a 360° angle counter which is reversible and which operates at all attitudes since the elements of the device are captive and are postively positioned at all time.

The display device of the present invention has many advantages. It has fewer and less complicated moving parts than conventional devices. It does not require the high driving torque of conventional devices. It is, moreover, more compact in design, and is light weight.

All the elements of the display device are captively supported, and therefore it may be operated at all attitudes, which is important in aircraft use. Its parts do not become misaligned and inoperative when subjected to shock and vibration. All the display elements 15 are positively driven and supported, and maintain their proper positions relative to each other without depending on the forces of gravity, weight, springs, etc.

The individual display elements 15 are not attached to each other. Accordingly, the sequence of messages may be arranged, and rearranged, as desired, without effecting the operation of other display elements 15.

The display messages may be changed easily by providing slots on faces 16 so that the faces are adapted to receive message-bearing inserts, made of paper or the like.

The invention is herein described as a display device having display elements. However, the invention may be used in other than the display field, and the invention is not limited to that field, just so long as the structure and operation of the device is as herein disclosed.

The display element of the present invention, when used as a 360° angle counter, is much smaller and less complex than previous devices which used complicated and expensive gearing and counter wheels, or used an endless tape.

The present invention may be utilized in twenty-four hour direct reading clocks. In such an application, conventional odometer drums may be used to indicate the seconds and minutes, and the display device of the present invention may be geared to those odometer wheels to indicate twelve hours, or twenty-four hours, as desired. If twelve hours are indicated and three-faced display elements 15 are used, only four display elements are necessary. Conventional clocks of this type used a complicated system of expensive gearing and counter wheels, or an endless tape mechanism which occupied considerable space.

It is to be understood that the form of the invention herewith shown and described is to be taken as a presently preferred embodiment. Various changes may be made in the shape, size and arrangement of parts. Equivalent elements may be substituted for those illustrated and described herein. For example, the tripping means may be a tripping finger having a ball-shaped end adapted to contact a tripping member having a series of sockets around its periphery, or the tripping finger may take the form of a cam lobe adapted to contact a tripping member in the form of a cam. Moreover, parts may be reversed, and certain features of the invention may be utilized independently of the use of other features, all without departing from the spirit or scope of the invention as defined in the subjoined claims.

I claim:

1. A reversible display device which operates at all attitudes, comprising a pair of end plates spaced apart from each other, a shaft rotatably supported by said end plates, a pair of driving wheels mounted on said shaft for rotation therewith, a series of three-faced display elements disposed about the periphery of said drive wheels and having planar end portions facing said drive wheels, said display elements having trunnions projecting from said end portions and rotatably supported in said wheels, a tripping means on one of the end portions of each display element and rotatable therewith, each tripping means having a plurality of tripping notches formed in its periphery adjacent to said drive wheel, a tripping finger transversely extending from an end plate in the path of said notches and adapted to contact a tripping notch to cause tripping rotation of the element to display another face, and a guide shoulder formed in said end plate for guiding the display elements during their movement by the driving wheels and preventing unwanted rotation of said elements around their trunnions, said guide shoulder having a cut-out portion on its inner periphery for permitting said tripping rotation, said tripping finger being disposed adjacent to said cut-out portion to permit partial rotation of said element without interference from said guide shoulder.

2. A reversible display device for displaying 36 numbers and adapted for use with an odometer wheel to act as a 360° angle counter which operates at all attitudes comprising: a pair of end plates spaced apart from each other, a pair of spaced-apart and interconnected driving wheels rotatably supported by and between said end plates, a series of 12 display elements disposed about the periphery of said driving wheels and rotatably supported by and between said driving wheels, each of said display elements being an equilateral triangle in cross-section and having three faces which bear numbers, a tripping means on each display element facing one of said drive wheels, said tripping means containing three tripping notches, one at each end corner of the faces of said display element, a tripping finger transversely extending from one of the end plates in the path of said tripping matches and adapted to contact a tripping notch to cause tripping rotation of the element to display another face, and a guide shoulder on one of said end plates for preventing unwanted rotation of said elements, said guide shoulder having a cut-out portion for permitting said tripping rotation, said tripping finger being disposed adjacent said cut-out portion to permit tripping rotation of said display element without interference from said guide shoulder.

References Cited by the Examiner

UNITED STATES PATENTS

| | | | |
|---|---|---|---|
| 865,356 | 9/1907 | Carr | 40—76 |
| 865,681 | 9/1907 | Cole | 40—76 |
| 914,543 | 3/1909 | Thrasher | 58—6 |
| 928,990 | 7/1909 | Lawson | 40—33 |
| 932,725 | 8/1909 | De Soria | 40—76 |
| 3,112,066 | 11/1963 | Brome | 235—1 |

FOREIGN PATENTS

| | | |
|---|---|---|
| 70,940 | 8/1892 | Germany. |
| 483,586 | 1/1930 | Germany. |
| 15,111 | 1909 | Great Britain. |

LOUIS J. CAPOZI, *Primary Examiner.*

LEO SMILOW, *Examiner.*

C. G. COVELL, *Assistant Examiner.*